(12) United States Patent
Stockett

(10) Patent No.: US 10,906,240 B2
(45) Date of Patent: Feb. 2, 2021

(54) PRINT HEAD FOR ADDITIVE MANUFACTURING SYSTEM

(71) Applicant: CC3D LLC, Coeur d'Alene, ID (US)

(72) Inventor: Ryan C. Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 358 days.

(21) Appl. No.: 15/961,039

(22) Filed: Apr. 24, 2018

(65) Prior Publication Data
US 2019/0001561 A1 Jan. 3, 2019

Related U.S. Application Data

(60) Provisional application No. 62/526,448, filed on Jun. 29, 2017.

(51) Int. Cl.
*B29C 64/209* (2017.01)
*B29C 64/165* (2017.01)
(Continued)

(52) U.S. Cl.
CPC .......... *B29C 64/209* (2017.08); *B29C 64/124* (2017.08); *B29C 64/165* (2017.08); *B29C 64/218* (2017.08); *B29C 64/255* (2017.08); *B29C 64/291* (2017.08); *B29C 64/295* (2017.08); *B29C 64/336* (2017.08); *B29C 64/393* (2017.08); *B29C 64/40* (2017.08); *B29C 70/06* (2013.01); *B29C 70/16* (2013.01);
(Continued)

(58) Field of Classification Search
CPC ... B29C 64/112; B29C 64/124; B29C 64/165; B29C 64/209; B29C 64/218; B29C 64/245; B29C 64/255; B29C 64/291; B29C 64/295; B29C 64/336; B29C 64/393; B29C 64/40; B29C 48/15; B29C 70/06; B29C 70/16; B29C 70/24; B29C 70/384; B29C 70/50; B29C 70/523; B29C 70/543; B33Y 10/00; B33Y 30/00; B33Y 50/02; B33Y 70/00
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 0198744 A1 * 10/1986 ........... B29C 70/323
(Continued)

OTHER PUBLICATIONS

International Search Report dated Aug. 10, 2018 for PCT/US18/33320 to CC3D LLC Filed May 18, 2018.
(Continued)

*Primary Examiner* — Xiao S Zhao
*Assistant Examiner* — Joseph S Leyson
(74) *Attorney, Agent, or Firm* — Ryan C. Stockett

(57) ABSTRACT

A print head is disclosed for use with an additive manufacturing system. The print head may include a nozzle having a base end, a tip end, and a cylindrical passage extending from the base end to the tip end. The print head may also include a compactor located at least partially inside of the nozzle at the tip end.

14 Claims, 2 Drawing Sheets

(51) Int. Cl.

| | | |
|---|---|---|
| *B33Y 30/00* | (2015.01) | |
| *B29C 64/218* | (2017.01) | |
| *B29C 64/336* | (2017.01) | |
| *B29C 70/38* | (2006.01) | |
| *B29C 70/06* | (2006.01) | |
| *B29C 70/52* | (2006.01) | |
| *B33Y 10/00* | (2015.01) | |
| *B29C 70/50* | (2006.01) | |
| *B29C 70/24* | (2006.01) | |
| *B29C 70/16* | (2006.01) | |
| *B33Y 70/00* | (2020.01) | |
| *B29C 64/295* | (2017.01) | |
| *B29C 64/291* | (2017.01) | |
| *B33Y 50/02* | (2015.01) | |
| *B29C 64/393* | (2017.01) | |
| *B29C 64/124* | (2017.01) | |
| *B29C 64/255* | (2017.01) | |
| *B29C 64/40* | (2017.01) | |
| *B29K 105/00* | (2006.01) | |
| *B29K 105/08* | (2006.01) | |
| *B29C 35/08* | (2006.01) | |
| *B29C 35/02* | (2006.01) | |
| *F16L 9/128* | (2006.01) | |
| *B29C 48/15* | (2019.01) | |
| *B22F 3/105* | (2006.01) | |
| *B29C 64/245* | (2017.01) | |
| *B22F 3/00* | (2006.01) | |
| *B29C 64/112* | (2017.01) | |
| *B29K 101/10* | (2006.01) | |

(52) U.S. Cl.
CPC ............ *B29C 70/24* (2013.01); *B29C 70/384* (2013.01); *B29C 70/50* (2013.01); *B29C 70/523* (2013.01); *B33Y 10/00* (2014.12); *B33Y 30/00* (2014.12); *B33Y 50/02* (2014.12); *B33Y 70/00* (2014.12); *B22F 3/008* (2013.01); *B22F 3/1055* (2013.01); *B22F 2003/1056* (2013.01); *B29C 35/0261* (2013.01); *B29C 35/0805* (2013.01); *B29C 48/15* (2019.02); *B29C 64/112* (2017.08); *B29C 64/245* (2017.08); *B29C 2035/0827* (2013.01); *B29C 2035/0833* (2013.01); *B29C 2035/0838* (2013.01); *B29C 2035/0855* (2013.01); *B29C 2035/0877* (2013.01); *B29K 2101/10* (2013.01); *B29K 2105/08* (2013.01); *B29K 2105/251* (2013.01); *F16L 9/128* (2013.01)

(56) References Cited

U.S. PATENT DOCUMENTS

| | | | |
|---|---|---|---|
| 3,956,056 A * | 5/1976 | Boguslawski | B21C 25/02 156/500 |
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,153,238 A * | 11/2000 | Shannon | A21C 15/005 220/789 |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2004/0060650 A1 * | 4/2004 | Holmes | B23K 26/032 156/272.2 |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2009/0139654 A1 * | 6/2009 | Wampler | B29C 70/384 156/324 |
| 2010/0200168 A1 * | 8/2010 | Oldani | B29C 70/382 156/441 |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2014/0361460 A1 | 12/2014 | Mark | |
| 2015/0136455 A1 | 5/2015 | Fleming | |
| 2015/0367446 A1 | 12/2015 | Buller et al. | |
| 2015/0367576 A1 * | 12/2015 | Page | B29C 64/112 264/257 |
| 2016/0012935 A1 | 1/2016 | Rothfuss | |
| 2016/0031155 A1 | 2/2016 | Tyler | |

(56) References Cited

U.S. PATENT DOCUMENTS

| | | |
|---|---|---|
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0257102 A1* | 9/2016 | Butler ................. B32B 37/0076 |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0136688 A1 | 5/2017 | Knecht et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173692 A1 | 6/2017 | Myerberg et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/

(56) References Cited

OTHER PUBLICATIONS

Vinylester Composite, Composite Structures, vol. 86, pp. 22-26 (Mar. 2008).
S Kumar & J.-P. Kruth, Composites by Rapid Prototyping Technology, Materials and Design, (Feb. 2009).
L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

PRINT HEAD FOR ADDITIVE MANUFACTURING SYSTEM

RELATED APPLICATIONS

This application is based on and claims the benefit of priority from U.S. Provisional Application No. 62/526,448 that was filed on Jun. 29, 2017, the contents of which are expressly incorporated herein by reference.

TECHNICAL FIELD

The present disclosure relates generally to a print head and, more particularly, to a print head for use in an additive manufacturing system.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength, compared to manufacturing processes that do not utilize continuous fiber reinforcement, it may be important to properly compact the material as it is discharged from the print and before the material fully cures. The disclosed print head is uniquely configured to provide this compaction and/or to address other issues of the prior art.

SUMMARY

In one aspect, the present disclosure is directed to a print head for an additive manufacturing system. The print head may include a nozzle having a base end, a tip end, and a cylindrical passage extending from the base end to the tip end. The print head may also include a compactor located at least partially inside of the nozzle at the tip end.

In another aspect, the present disclosure is directed to another print head for an additive manufacturing system. This print head may include a nozzle having a base end, a tip end, and a cylindrical passage extending from the base end to the tip end. The print head may also include a compactor captured within a cavity in the nozzle at the tip end. A central axis of the cylindrical passage may pass through the compactor. The print head may further include an orifice connecting the cylindrical passage to the cavity.

In yet another aspect, the present disclosure is directed to an additive manufacturing system. The additive manufacturing system may include a moveable support, and a print head connected to the moveable support. The print head may be configured to discharge a continuous reinforcement that is wetted with a liquid matrix. The print head may include a matrix reservoir, and a nozzle having a base end fluidly connected to the matrix reservoir, a tip end, and a cylindrical passage extending from the base end to the tip end. The print head may also include a compactor captured within a cavity in the nozzle at the tip end. A central axis of the cylindrical passage may pass through the compactor. The print head may further include an orifice connecting the cylindrical passage to the cavity, and a cure enhancer configured to direct cure energy onto the liquid matrix after compression of the reinforcement by the compactor. The additive manufacturing system may additionally include a controller configured to regulate operation of the moveable support and the cure enhancer.

DETAILED DESCRIPTION

Figure 1:
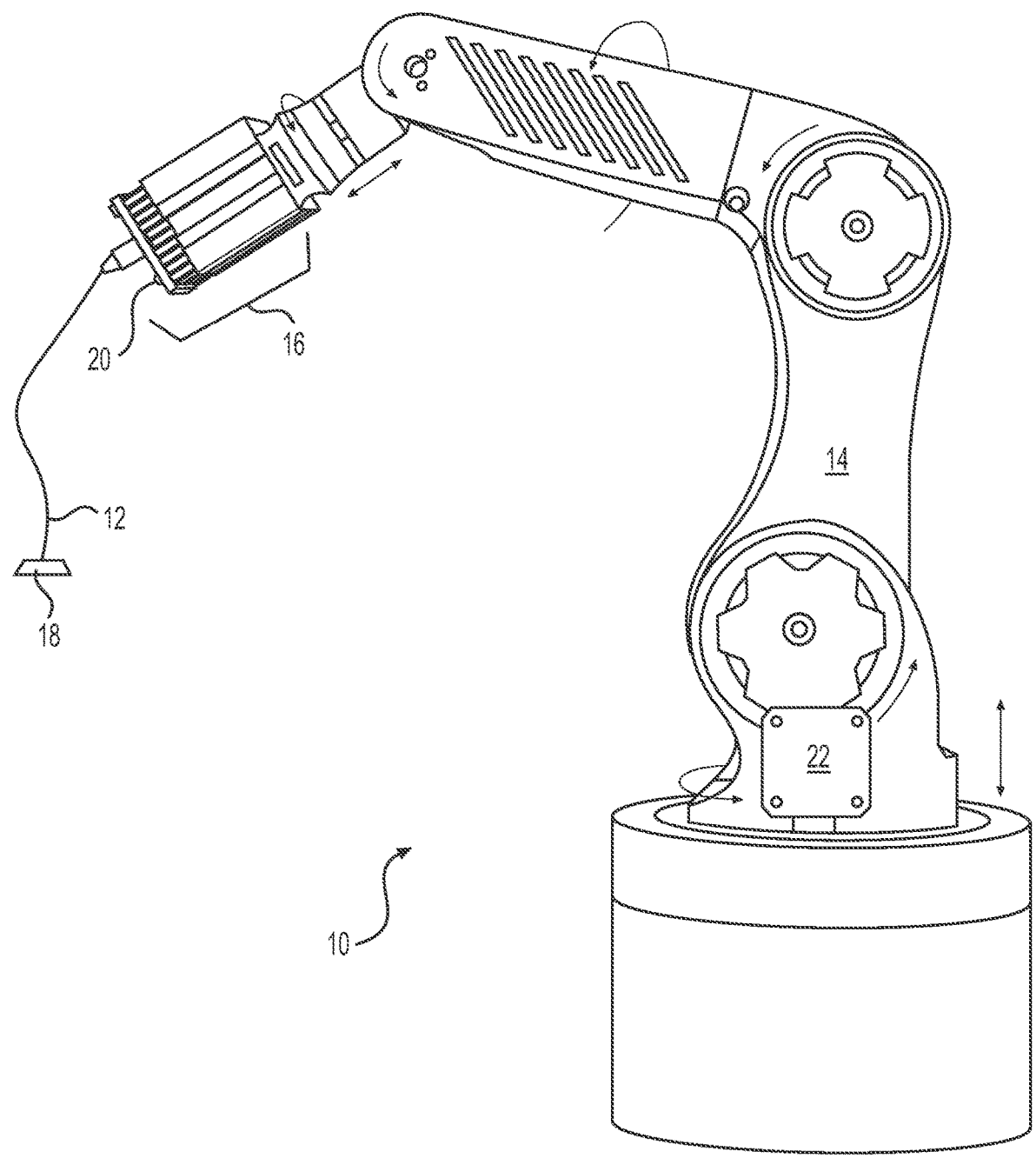
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, ellipsoidal, polygonal, etc.). System 10 may include at least a support 14 and a print head ("head") 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from head 16 via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, ultrasonic emitters, lasers, heaters, catalyst dispensers, microwave generators, etc.) 20 may be mounted proximate (e.g., on and/or trailing from) head 16 and configured to enhance a cure rate and/or quality of the matrix as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

Figure 2:
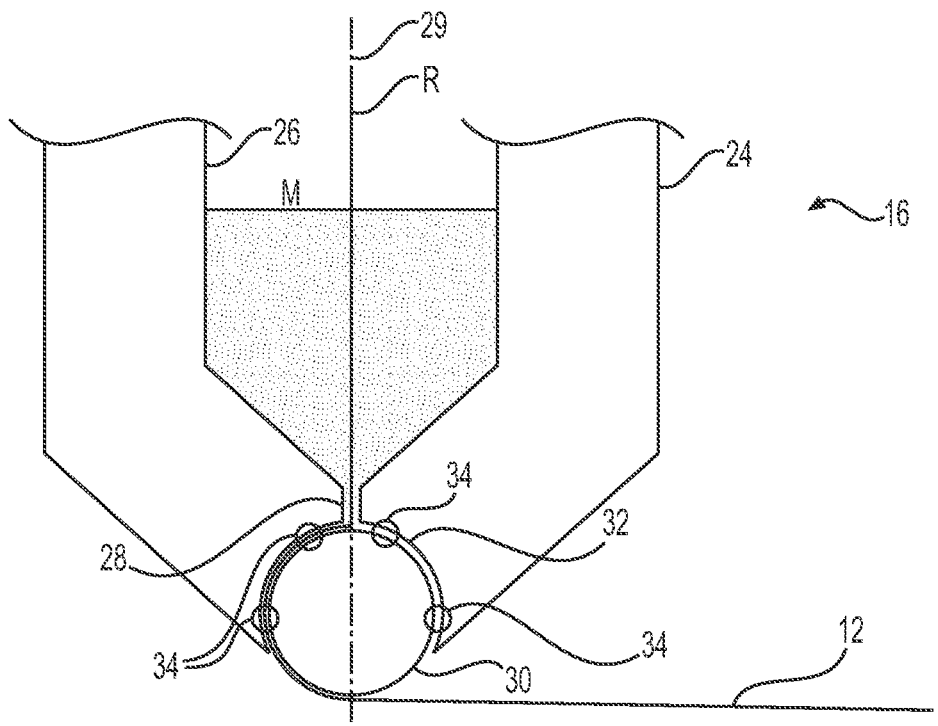
FIGS. 2 and 3 are diagrammatic illustrations of exemplary disclosed print heads that may be utilized with the manufacturing system of FIG. 1.

An exemplary portion of head 16 is disclosed in detail in FIG. 2. As shown in this figure, head 16 may include, among other things, one or more nozzles 24 that are fluidly connected to a matrix reservoir 26. Although matrix reservoir 26 is shown as being at least partially inside of head 16, it should be noted that matrix reservoir 26 could alternatively be located separately upstream of head 16. Each nozzle 24 may be a generally cylindrical component having an upstream or base end, a downstream or tip end, and one or more axially oriented passages that extend from the base end to the tip end.

Any number of reinforcements (represented as R in FIG. 2) may be passed axially through reservoir 26 where at least some matrix-wetting occurs (matrix represented as M in FIG. 2), and discharged from head 16 via nozzle(s) 24. In the disclosed embodiment, a single nozzle 24 is utilized that has a straight axial or convergent internal passage. In multi-nozzle applications, however, it may be helpful for the internal passage of each nozzle 24 to have a divergent shape to facilitate coalescing of the different matrix-coated fibers into a ribbon or sheet of composite material.

One or more orifices 28 may be located at a tip end of nozzle 24 to accommodate passage of the matrix-wetted reinforcements. In the disclosed embodiment, a single generally circular orifice 28 is shown. It is contemplated, however, that multiple circular orifices could be used. In addition, orifices 28 of another shape (e.g., a rectangular shape) may allow for printing of ribbons and/or sheets. In the embodiment of FIG. 2, the single orifice 28 is substantially aligned (e.g., aligned within engineering tolerances) with a central axis 29 of nozzle 24.

The matrix-wetted reinforcement(s) passing through orifice(s) 28 may impinge against an outer annular surface of an integral compactor 30. This impingement may occur prior to complete curing of the matrix material and also prior to the newly discharging material engaging an existing surface (e.g., a build platform or previously discharged material). In other words, compactor 30 may be the first thing engaged by the matrix-wetted reinforcement after discharge from orifice(s) 28.

Compactor 30 may be a rolling-type device configured to both place the matrix-wetted material (e.g., to apply the material to the build platform and/or the previously discharged material) and compress the material. In the example of FIG. 2, compactor 30 is a generally spherical ball that is captured within a cavity 32 at the tip of nozzle 24. An outer diameter of the generally spherical ball may be smaller than an inner diameter of cavity 32 by, for example, at least two times a diameter of the reinforcement(s) being discharged. An opening into cavity 32 at a side opposite orifice(s) 28 may have a diameter that is less than the outer diameter of the generally spherical ball, such that the generally spherical ball is retained within cavity 32. In one embodiment, the generally spherical ball may be assembled (e.g., pressed) through the opening and into cavity 32, causing temporary deformation of the opening. In another embodiment, the opening may be formed within a removable point of nozzle 24. Axis 29 may pass directly through a center of the generally spherical ball (i.e., after assembly into cavity 32), through orifice(s) 28, and/or through a center of the opening, in some configurations. Alternatively, the generally spherical ball could be offset relative to axis 29 in a travel direction of head 16. It should be noted that, even when the generally spherical ball is offset from axis 29, the generally spherical ball may still at least partially extend across an end of orifice 28, such that the discharging reinforcement impinges compactor 30 (e.g., at an upper apex location).

The generally spherical ball of compactor 30 may be fabricated from aluminum, steel, Delron, Teflon, Nylon, or another similar material known in the art. The generally spherical ball may have a diameter of about 0.25-5.0", and an outer annular surface that is smooth, porous, or roughened (e.g., knurled) to reduce drag, inhibit reinforcement breakage, maintain orientation and/or integrity of the reinforcements, and to reduce wear. It is contemplated that, in some instances, a scraper could be associated with compactor 30, if desired, to remove and/or collect excess resin. For example, tip edges of nozzle 24 (e.g., at the opening) may be sharpened and spaced close enough (e.g., angled inward) to the generally spherical ball to knock away hardened resin particles.

The generally spherical ball of compactor 30, in the embodiment of FIG. 2, may be free to move within cavity 32. In this arrangement, the associated matrix may function as a lubricant, facilitating low-friction rotations of compactor 30 within cavity 32. It is contemplated, however, that in some applications, one or more roller- and/or ball-type bearings 34 could be oriented around the inner surface of cavity 32 (e.g., biased toward compactor 30) to further reduce friction during rolling of the generally spherical ball. In some embodiments, compactor 30 may be driven to rotate by way of bearings 34, if desired. For example, an actuator (e.g., an electric or hydraulic motor) could be connected to drive bearings 34, and bearings 34 may impart this motion to compactor 30. It is contemplated that, in addition to compactor 30 functioning to compact the material discharging from nozzle 24, compactor 30 could also be controlled to pull material from nozzle 24. This may be helpful, for example, at a start of a printing operation when the material is being attached to an anchor point 18 (referring to Fig.).

Figure 3:
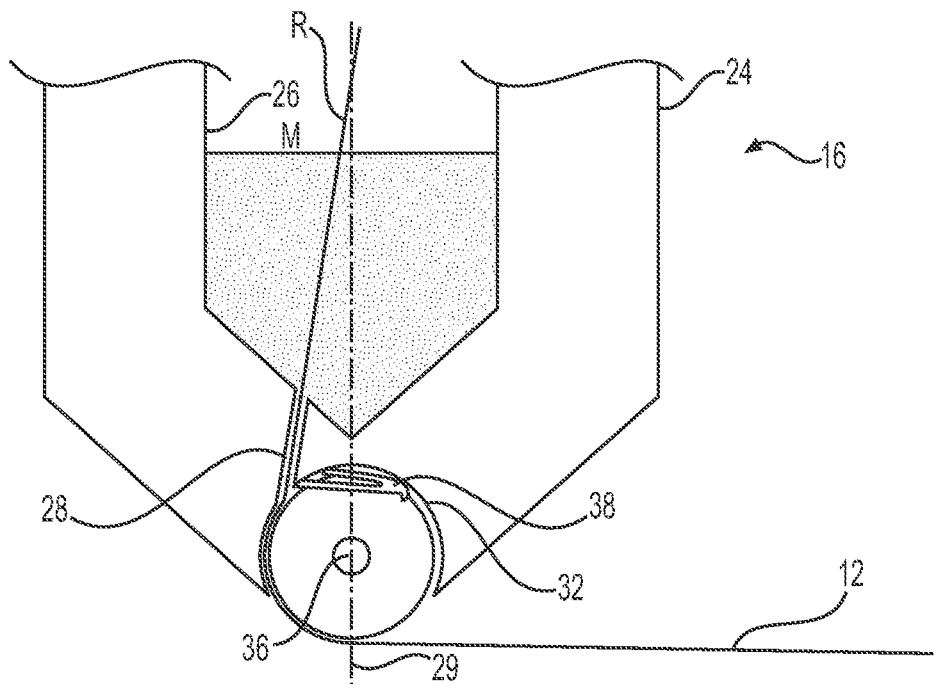

FIG. 3 illustrates another embodiment of nozzle 24 and compactor 30 that has similarities with the embodiment of FIG. 2. For example, compactor 30 may be located at the tip end of nozzle 24, within cavity 32 and at an outlet of orifice(s) 28. However, in contrast to the embodiment of FIG. 2, orifice(s) 28 may not be aligned with axis 29 in the embodiment of FIG. 3. Instead, orifice(s) 28 may be offset from axis 29 in a forward travel direction of head 16. In addition, instead of a generally spherical ball, compactor 30 may embody a roller (e.g., a cylindrical roller, a crowned roller, etc.) having an axis 36 that is generally perpendicular to and passes through axis 29. The roller-type compactor 30 may be free to move inside cavity 32 or rotationally supported by way of an axle. Furthermore, compactor 30 may be biased (e.g., via a spring 38) away from orifice(s) 28 and toward the opening at the point of nozzle 24. It should be noted that spring 38 could also or alternatively be used with the generally spherical ball, if desired. Spring 38 may help to ensure that orifice(s) 28 remain clear from obstruction that could hinder movement of the reinforcements. In this embodiment, the discharging reinforcements may impinge compactor 30 at a location below the upper apex. In this configuration, care may need to be taken to ensure that head 16 is pivoted to an angle that allows compactor 30 to follow a trajectory of head 16 and roller over the discharging material.

INDUSTRIAL APPLICABILITY

The disclosed system and print head may be used to continuously manufacture composite structures having any desired cross-sectional size, shape, length, density, and/or strength. The composite structures may include any number of different reinforcements of the same or different types, diameters, shapes, configurations, and consists, each coated with a common matrix. In addition, the disclosed print head may allow for compaction of the reinforcements prior to complete curing. This may increase a strength and reduce a porosity of the resulting composite structures. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing the reinforcements down through matrix reservoir 26, and then threading the reinforcements through any nozzles 24 that exist and around compactor 30. Installation of the matrix may include filling reservoir 26 within head 16 and/or coupling of an extruder or external bath (not shown) to head 16. Head 16 may then be moved by support 14 under the regulation of controller 22 to cause matrix-coated reinforcements to be placed against or on a corresponding anchor point 18. Cure enhancers 20 within head 16 may then be selectively activated to cause hardening of the matrix surrounding the reinforcements, thereby bonding the reinforcements to anchor point 18.

The component information may then be used to control operation of system 10. For example, the reinforcements may be pulled and/or pushed from head 16 (along with the matrix), while support 14 selectively moves head 16 in a desired manner during curing, such that an axis of the resulting structure 12 follows a desired trajectory (e.g., a free-space, unsupported, 3-D trajectory). As the separate reinforcements are pulled through head 16, the reinforcements may first contact compactor 30 and be rolled onto and compressed into an existing surface. Once structure 12 has grown to a desired length, structure 12 may be disconnected (e.g., severed) from head 16 in any desired manner.

The disclosed compactor provides many benefits. For example, because compactor 30 fits almost completely inside the point of nozzle 24, head 16 may be small, simple, and self-contained. In addition, because the wetted reinforcements may first contact compactor 30, the compression provided by compactor 30 may be more accurate and less opportunity for misalignment or contamination of the reinforcements may be available. Further, the generally spherical ball embodiment of compactor 30 may allow for omnidirectional movements of head 16 without the need to continuously pivot head 16 about axis 29 (e.g., without the need to ensure that compactor 30 is always at the trailing side of nozzle 24).

It will be apparent to those skilled in the art that various modifications and variations can be made to the disclosed systems and head. Other embodiments will be apparent to those skilled in the art from consideration of the specification and practice of the disclosed systems and heads. For example, it is contemplated that multiple compactors 30 could be co-mounted within a common nozzle 24, if desired, in an end-to-end configuration. This configuration could allow for ribbon- and/or sheet-printing while cornering, where each compactor may need to rotate at a different speed to inhibit bunching of the discharging reinforcement. It is intended that the specification and examples be considered as exemplary only, with a true scope being indicated by the following claims and their equivalents.

What is claimed is:

1. An additive manufacturing system, comprising:
    a moveable support;
    a print head connected to the moveable support and configured to discharge a continuous reinforcement, the print head including:
        a nozzle having a base end, a tip end, and a passage extending from the base end to the tip end, wherein the continuous reinforcement discharges through the passage;
        a compactor located at the tip end, wherein an axis of the passage passes through the compactor and the compactor is configured to roll over and compact the continuous reinforcement against an adjacent build surface;
        a cavity formed within the tip end of the nozzle and configured to at least partially receive the compactor; and
        an orifice connecting the passage to the cavity, wherein the compactor is biased away from the orifice.

2. The additive manufacturing system of claim 1, wherein the compactor is at least one of a cylindrical roller and a crowned roller.

3. The additive manufacturing system of claim 1, wherein the compactor has a diameter larger than an opening of the cavity, such that the compactor is retained in the opening by interference of the compactor with the tip end of the nozzle.

4. The additive manufacturing system of claim 1, wherein the orifice is generally aligned with the axis of the passage.

5. The additive manufacturing system of claim 1, wherein the orifice is offset from the axis of the passage in a travel direction of the print head.

6. The additive manufacturing system of claim 1, wherein the continuous reinforcement passing through the nozzle engages the compactor prior to placement.

7. The additive manufacturing system of claim 6, further including a cure enhancer mounted to the print head, wherein the continuous reinforcement engages the compactor prior to in-situ exposure of a matrix surrounding the continuous reinforcement by a cure energy generated by the cure enhancer.

8. An additive manufacturing system, comprising:
    a moveable support;
    a print head connected to the moveable support and configured to discharge a continuous reinforcement, the print head including:
        a nozzle having a base end, a tip end, and a passage extending from the base end to the tip end, wherein the continuous reinforcement discharges through the passage; and
        a compactor located at the tip end, wherein an axis of the passage passes through the compactor and the compactor is configured to roll over and compact the continuous reinforcement against an adjacent build surface, wherein the compactor is a generally spherical ball configured to rotate relative to the nozzle.

9. An additive manufacturing system comprising:
    a moveable support;
    a print head connected to the moveable support and configured to discharge a continuous reinforcement, the print head including:
        a nozzle having a base end, a tip end, and a passage extending from the base end to the tip end, wherein the continuous reinforcement discharges through the passage;
        a compactor located at the tip end, wherein an axis of the passage passes through the compactor and the compactor is configured to roll over and compact the continuous reinforcement against an adjacent build surface;
        a cavity formed within the tip end of the nozzle and configured to at least partially receive the compactor; and
        a bearing disposed at least partially inside the cavity and configured to engage an outer surface of the compactor.

10. The additive manufacturing system of claim 9, wherein the bearing is driven to rotate the compactor.

11. An additive manufacturing system, comprising:
a moveable support;
a print head connected to the moveable support and including:
a nozzle having a base end, a tip end, and a cylindrical passage extending from the base end to the tip end;
a compactor disposed at least partially within a cavity in the nozzle at the tip end and having a diameter larger than an opening of the cavity, such that the compactor is retained inside of the cavity by interference of the compactor with the tip end of the nozzle; and
an orifice connecting the cylindrical passage to the cavity, wherein the orifice is offset from an axis of the cylindrical passage in a travel direction of the print head.

12. The additive manufacturing system of claim 11, wherein the compactor is one of a generally spherical ball, a cylindrical roller, and a crowned roller that rotate and compact material discharging from the nozzle.

13. The additive manufacturing system of claim 11, wherein a reinforcement passing through the nozzle engages the compactor prior to placement and prior to curing of a matrix surrounding the reinforcement.

14. An additive manufacturing system, comprising:
a moveable support;
a print head connected to the moveable support and configured to discharge a continuous reinforcement that is wetted with a liquid matrix, the print head including:
a matrix reservoir;
a nozzle having a base end fluidly connected to the matrix reservoir, a tip end, and a cylindrical passage extending from the base end to the tip end;
a compactor captured within a cavity in the nozzle at the tip end, wherein a central axis of the cylindrical passage passes through the compactor;
an orifice connecting the cylindrical passage to the cavity; and
a cure enhancer configured to direct cure energy onto the liquid matrix after compression of the continuous reinforcement by the compactor; and
a controller configured to regulate operation of the moveable support and the cure enhancer.

\* \* \* \* \*